(12) United States Patent
Emilsen et al.

(10) Patent No.: US 7,703,752 B2
(45) Date of Patent: Apr. 27, 2010

(54) METHOD AND EQUIPMENT FOR MIXING FLUIDS

(75) Inventors: Morten Emilsen, Oslo (NO); Svein Bekken, Langesund (NO); Roger Abrahamsen, Oslo (NO)

(73) Assignee: Yara International ASA, Oslo (NO)

( * ) Notice: Subject to any disclaimer, the term of this patent is extended or adjusted under 35 U.S.C. 154(b) by 897 days.

(21) Appl. No.: 10/565,386

(22) PCT Filed: Jul. 23, 2004

(86) PCT No.: PCT/NO2004/000228

§ 371 (c)(1),
(2), (4) Date: Sep. 12, 2006

(87) PCT Pub. No.: WO2005/009598

PCT Pub. Date: Feb. 3, 2005

(65) Prior Publication Data

US 2007/0035048 A1 Feb. 15, 2007

(30) Foreign Application Priority Data

Jul. 25, 2003 (NO) .................................. 20033348

(51) Int. Cl.
*B01F 3/04* (2006.01)
(52) U.S. Cl. ........................ 261/77; 261/79.2
(58) Field of Classification Search .................. 261/76, 261/77, 79.1, 79.2, DIG. 75
See application file for complete search history.

(56) References Cited

U.S. PATENT DOCUMENTS

| 5,865,995 A | * | 2/1999 | Nelson ........................ 210/205 |
| 6,207,064 B1 | * | 3/2001 | Gargas ........................ 210/752 |
| 6,264,174 B1 | * | 7/2001 | Chang et al. .................. 261/29 |
| 6,382,601 B1 | | 5/2002 | Ohnari |
| 6,849,189 B2 | * | 2/2005 | Curlee et al. ................. 210/703 |
| 6,955,341 B2 | * | 10/2005 | Liou .......................... 261/64.1 |
| 7,097,160 B2 | * | 8/2006 | Nelson ........................ 261/29 |

FOREIGN PATENT DOCUMENTS

| EP | 1112773 | 7/2001 |
| GB | 1570202 | 6/1980 |
| JP | 2002-59186 | 2/2002 |

OTHER PUBLICATIONS

European Official Action (in English language) issued Aug. 18, 2008.

* cited by examiner

*Primary Examiner*—Scott Bushey
(74) *Attorney, Agent, or Firm*—Wenderoth, Lind & Ponack, L.L.P.

(57) ABSTRACT

The present invention concerns a method and equipment for dissolving a gas or a gas mixture in a liquid. The liquid is introduced into a chamber (6) via an inlet (2), in connection with which an eddy movement is created in the chamber for mixing the gas and liquid. The gas may be introduced into the liquid before the liquid is introduced into the chamber and/or the gas may be introduced directly into the chamber. The liquid with the dissolved gas is removed via an outlet (4). The gas is dissolved in the liquid by the eddy rotating about a mainly horizontal axis. With the present invention, satisfactory dissolution can be achieved with minimal energy consumption. The present invention is particularly well suited to oxygenating salt water, for example in connection with fish farming.

9 Claims, 2 Drawing Sheets

METHOD AND EQUIPMENT FOR MIXING FLUIDS

The present invention concerns a method and equipment for dissolving gas in a liquid. In particular, the present invention concerns the dissolution of a gas in fresh water and/or salt water, where the gas may, for example, consist of oxygen or carbon dioxide.

The present invention may be used for oxygen enrichment of water and may thus be used in connection with the farming of fish or other beings that live in water. U.S. Pat. 4,834,343 describes a method for creating contact between a gas and a liquid. The gas and the liquid are mixed in a pipe before being passed to the top of an eddy chamber and on tangentially into it. In the eddy chamber the mixture is subject to a rotating movement around a vertical axis at the same time as another rotating flow is set up along the same axis. The downward component of the flow is further reinforced by it being possible for liquid to be introduced axially at the top of the chamber. In connection with the flows that occur, shear forces and turbulent flow are produced. They are intended to cause the size of gas bubbles in the mixture to be broken down. In order to achieve satisfactory results, liquid must be supplied to the chamber axially, as, otherwise, bubbles may be transported in towards a central area in the eddy in such a way that an inactive area is formed in the centre of the eddy with little mass transfer as a result.

Other disadvantages with prior art solutions for the dissolution of a gas in a liquid are that they are based on changes in direction and cross-section transitions for the flowing liquid, which will involve pressure loss and the use of additional pumps or boosters to maintain the desired pressure/volume flow, which, in turn, will entail increased costs.

An apparatus and method for dissolving gas in a liquid where there is a change in direction of the flow, is described in International patent application WO8101700. The apparatus has an inlet pipe for liquid communicating with the top of a vertical generally cylindrical chamber communicating with a horizontal cylindrical main chamber. Gas and liquid is supplied to the vertical chamber where the mixing takes place. In the main chamber there is no rotation, only linear flow. Undissolved gas is collected in a chamber for recirculation. Use of a venturi nozzle in the inlet makes it necessary to use of a pump in connection with the apparatus.

In U.S. Pat No. 6,382,601 it is described a swirling fine-bubble generator with conical or bottle-like shape where water and gas is added separately. The water is supplied tangentially and under pressure. A pump is necessary. A swirl is formed along the central axis and the micro bubbles are formed at the outlet. It is necessary to use such a high pressure that the bubbles do not coalesce. The narrowing down of the apparatus leads to a large pressure loss that makes it necessary to utilise a much higher water pressure. The whole apparatus or at least the outlet of the apparatus must be submerged in liquid.

The object of the invention is to obtain a simple, robust method and equipment for dissolving gas in a liquid. Another object is to be able to utilise a low pressure water source without the need of a pump.

This and other objects of the invention can be obtained with the method and equipment as described below and the invention is further defined and characterised by the accompanying patent claims.

The invention thus concerns a method and equipment for dissolving a gas or a gas mixture in a liquid where the liquid is introduced tangentially into a chamber creating an eddy rotating about a mainly horizontal axis. The chamber is mainly cylindrical and shaped in such a way that essential pressure loss in the chamber is avoided. The inlet and outlet of the chamber must have such a dimension that they do not cause significant pressure loss. The gas could be introduced into the liquid before the liquid is introduced to the chamber or it could be introduced directly into the chamber. It is preferred that the eddy movement is such that the mixture has a helical movement. The liquid inlet is mainly horizontal and it is preferred that the outlet is arranged tangentially to the chamber. It could also be arranged centrally. The liquid with dissolved gas is preferably supplied to a tank via pipes and nozzles submerged in the fluid in the tank, where the pressure is released. The gas is preferably oxygen or carbon dioxide and the liquid fresh water and/ or salt water.

The apparatus is horizontal and the micro bubbles are generated in the inlet and in the first part of the cylindrical apparatus. The rest of the space is for transport only. It is used water of low pressure and the pressure is maintained through the whole apparatus.

The present invention represents a simple, robust method and equipment for dissolving gas in a liquid. In accordance with the present invention, satisfactory results can be achieved for the dissolution of gas in a liquid at the same time as energy consumption is minimal. Moreover, the present invention is simple to produce and requires a minimum of connections and additional equipment to ensure stable, effective dissolution of gas in liquid.

The invention will be further explained with reference to the accompanying drawings, FIGS. 1-2, wherein.

Figure 1:
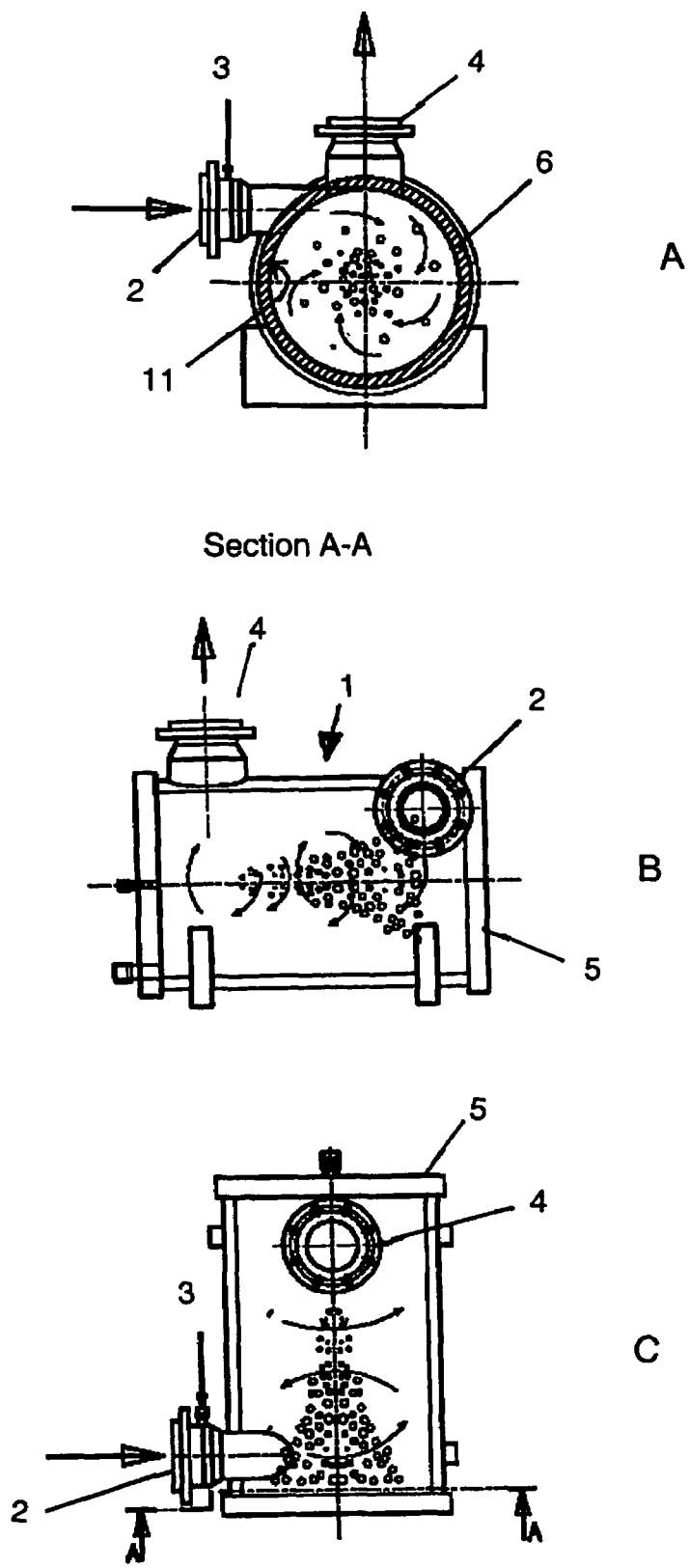
FIG. 1A shows a cross-section through the equipment at its inlet end.
FIG. 1B shows a side view of equipment.
FIG. 1C shows a top view of the equipment.

FIG. 1A shows a cross section at its inlet end of the equipment 1 in accordance with the present invention. As this figure shows, the cross-section of the chamber is mainly circular so that the chamber's internal surface will mainly be cylindrical. A liquid inlet 2 is provided for communication with an extended chamber 6. The chamber is located so that its axis is mainly horizontal. A gas inlet 3 is provided in connection with the liquid inlet, which is also mainly horizontal. Upstream of these inlets for gas and liquid, there may be means for control/regulation of the quantity/pressure of the inflowing fluids (not shown). Alternatively, the gas may be introduced directly into the chamber without being mixed with the liquid in advance, or it may be introduced partly directly into the chamber and partly into the liquid flow before the chamber.

The chamber 6 may also be mounted in a frame 5, (shown in FIGS. 1B and C) consisting of plates, profiles or other appropriate construction materials that ensure its stable mounting. As stated above, the chamber 6 is designed as an extended body in which the inlet 2 is arranged tangentially to it.

At the downstream end of the chamber 6 is an outlet 4, see FIGS. 1A-C. As the figures show, the outlet extends upwards and is in a tangential or centred position in relation to the chamber 6.

Figure 2:
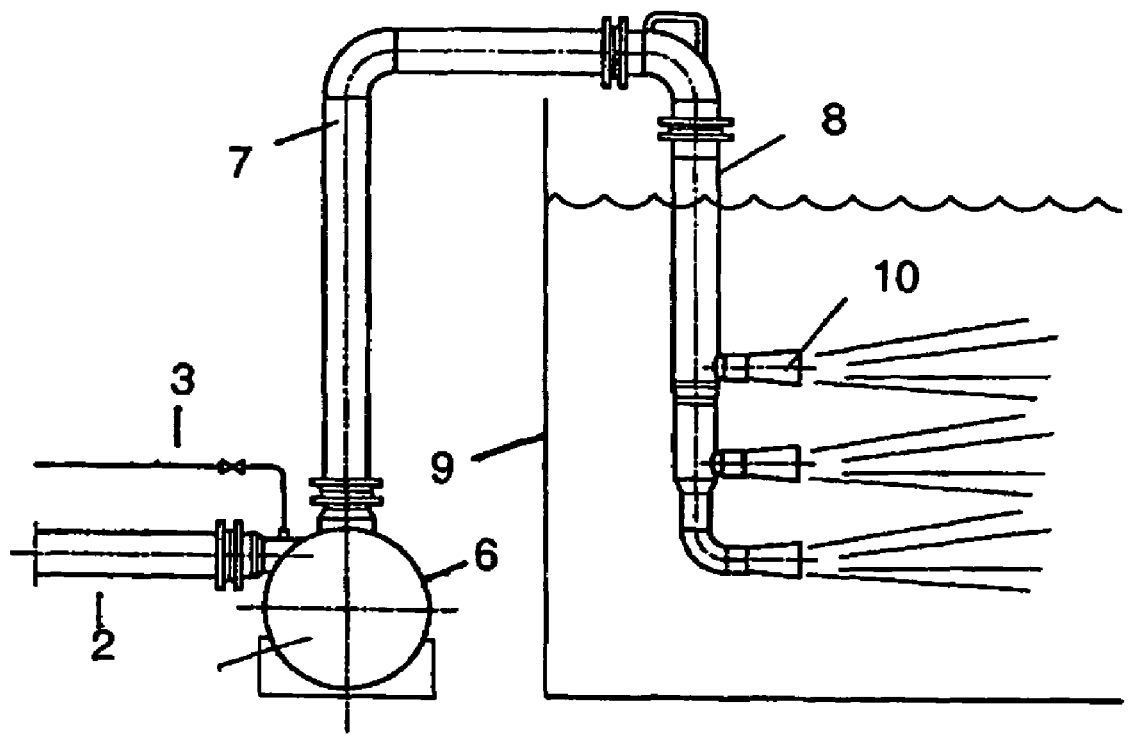
FIG. 2 shows the equipment connected to a farming tank via a water distribution pipe and an adapted jet pipe.

In FIG. 2, the equipment is shown connected to a farming tank via water distribution pipes 7 and an adapted jet pipe 8, utilising existing local low-pressure water. The treated water is supplied to the tank 9 via one or more nozzles 11. As illustrated in this figure, the equipment is placed outside the farming tank, which saves valuable space in the tank and makes service easier. The whole water supply to the farming tank passes through the equipment for dissolving gas into the water. Both inlet and outlet pipes should have such a dimension that essential pressure loss is avoided.

Method of Operation of the Present Invention:

The present invention is based on the principle that the inflowing fluid or fluid mixture (gas and liquid) sets up an eddy movement in the chamber 6. The eddy movement occurs and is supported in a relatively wide interval of flow parameters related to the inflowing fluid. Under certain conditions for the chamber's cross-section and the inlet's cross-section, the volume flow of the inflowing fluid will generally determine the flow that occurs in the chamber.

Testing has shown that an important parameter is the dimensioning of the inlet pipe. The inlet energy creates a continuous turbulent zone that consists of a cylinder that fills the entire main pipe in the first third of its length and subsequently a decreasing cone in the next third, this is illustrated in the Figures. This rotates at a higher speed than the rest of the water and meets resistance generated partially by injected gas and partially by slip friction against the rest of the water.

Many forces and mechanisms occur in the turbulence zone. This is where gas is dissolved and microbubbles are generated. In the last third, the water rotates at "normal" speed in relation to the diameter and through-flowing water quantity. This is so low that a gas cylinder is not created in the centre. This becomes a transport zone towards the outlet. The outlet, in turn, is a compromise between pressure loss and a reasonable flow speed to maintain the microbubbles up to the tank. The dissolving equipment is suitable for use at low pressure such as 0.3 to 1 bar.

Tests have shown that, with a volume flow that is too low, the fluid will flow into the fluid in the chamber without a dominant eddy movement being initiated. If the volume flow is increased, the fluid in the chamber will gradually start to rotate and assume an eddy movement. If the volume flow is increased further, the eddy will rotate faster and faster until a gas volume is created that is located centrally and coaxially in the chamber. In the tests, the volume flow out of the chamber was equivalent to the volume flow into it. As a consequence of this, fluid was transported partly in a circulating movement around the longitudinal axis of the chamber and partly downstream along this axis. Fluid will thus mainly be transported along a helix. The fluid's dwell time in the chamber will be determined by the volume flow into/out of the chamber at any time, and by the dimensions of the chamber such as diameter and length.

It has been shown that, by adapting the volume flow, the dimensions of the chamber and the dimensions of the inlet/outlet, it is possible to achieve very satisfactory dissolution of gas in liquid with a limited pressure loss. Among other things, tests have been carried out on the dissolution of oxygen in water with some salt content. The results show that good oxygen dissolution can be achieved with low energy consumption.

In particular, it has proved possible to achieve satisfactory dissolution by creating an eddy that runs mainly from the inlet end to the outlet end. Moreover, it has been shown that this eddy is supported in a relatively wide interval of flow-determining parameters, while a centrally, coaxially located gas pocket can be avoided completely or partially.

The diameters for inlet pipes, chamber, outlet pipes, jet pipe and nozzles should be of such a dimension that coalescence is avoided and that too high pressure loss is avoided. In the nozzles the flow must be so high that the pressure is released and that any large bubbles are broken down to micro bubbles. A minimum speed must be maintained at the outlet of the nozzles, in such a way that the micro bubbles are distributed 1-2 m horizontally.

In the inlet to the chamber the flow rate must be high enough to create the necessary rotation, but not so high that pressure loss and separation of gas/fluid is the result. In the chamber the total flow rate must be low enough to ensure the necessary retention time, but not so low that the gas is separated out at the top of the chamber.

Typical flow rates are as follows:

| | |
|---|---|
| Inlet to chamber: | 2-3 m/s |
| Chamber: | about 0.2 m/s in the horizontal direction |
| Outlet pipes and jet pipe: | 2-2.5 m/s |
| Within nozzle: | 4-10 m/s (at pressures 0.3-1 bar) |
| Outlet from nozzle: | 1-1.5 m/s |

The physical phenomena that occur in connection with the dissolution of gas in liquid in accordance with the present invention are assumed to be a result of the fact that the gas that is introduced with the liquid into the chamber in the form of bubbles will primarily, on account of its buoyancy in the liquid, be moved up towards the cylindrical surface 11 of the chamber almost immediately after entering the chamber. Since the flow is deflected continuously on account of the curvature of the internal surface 11, shear and compressive forces will occur in the fluid, causing the liquid to compress the gas bubbles and divide them into more smaller bubbles, thus creating a greater contact area between the gas and liquid.

Another effect is that, in the boundary surface between the internal surface 11 and the fluid, the bubbles that are located there will have one side facing the stationary surface 11 and one side in the flowing fluid. This will cause the creation of shear forces that tear the bubbles up into smaller bubbles. This corresponds to the established theory in fluid mechanics that shear forces occur in the boundary layer between a flow and a stationary guide surface on account of different speed vectors in this layer.

Bubbles that are not immediately dissolved in the liquid will, along the helical flow path, tend to rise vertically upwards because the gas bubbles have greater buoyancy than the surrounding liquid. This causes undissolved gas bubbles to be lifted up towards the upper half of the internal surface 11 and in towards the boundary surface or boundary layer between the flowing fluid and the stationary surface 11. As described above, bubbles that occur there will be torn/crushed into smaller bubbles by the interaction between the flowing fluid and the surface.

Derived from the above principle, the surface 11 may expediently be designed with a roughness or smaller deviation from a smooth surface in order to reinforce its affinity to the bubbles and further improve the conversion of large bubbles into smaller bubbles.

The present invention has proved to be particularly well suited for dissolving oxygen in salt water and thus has an important application in connection with farming beings that live in salt water such as salt-water fish. The present invention is particularly well suited to land-based farming of salt-water fish in farming tanks.

The dissolving equipment is particularly well suited to mixing oxygen into salt water at low pressure, but also functions with carbon dioxide in fresh water (because $CO_2$ is much easier to dissolve in water than oxygen).

The dissolving equipment can be said to be a combination of dissolving equipment and a microbubble generator. It utilises the fact that it is relatively easy to create microbubbles or floating bubbles of oxygen in salt water (they assume a modified surface tension on account of the salt). Unlike "normal" bubbles, these bubbles follow the water flow without rising or merging as soon as the speed and transport length are correctly adjusted.

The proportion of gas that constitutes microbubbles varies from 5% at low load to approximately 30% at full oxygen supply. These microbubbles are transported up into the farming tank with an adapted jet pipe and will dissolve in the undersaturated water in the tank.

There will be a certain amount of loss (to the surface) in this process, which has the favourable effect of stripping out undesired gases such as nitrogen and carbon dioxide, but which naturally reduces oxygen efficiency.

Experiments have shown that the total oxygen utilisation of the present invention is 80 to 95% (depending on the depth and water rotation speed of the farming tank).

In Table 1 it is shown results from experiments carried out with salt-water and oxygen in a farming tank.

TABLE 1

| RAW WATER | | | | | DOSED O$_2$ | | ANALYSED O$_2$ | | |
|---|---|---|---|---|---|---|---|---|---|
| O$_2$ mg/l | O$_2$ % sat. | T [° C.] | P [barg] | Q [l/min] | kg/h | mg/l | mg/l | % sat. | % eff. |
| 9.48 | 81.7 | 9.7 | 0.3 | 460 | 0.322 | 11.7 | 20.5 | 178 | 94.0 |
| 9.80 | 88 | 11.4 | 0.3 | 410 | 0.322 | 13.1 | 20.2 | 181 | 79.4 |

The invention claimed is:

1. A method for dissolving a gas or a gas mixture in a liquid in which the liquid is introduced into a chamber (6) via an inlet (2), in connection with which an eddy movement is created in the chamber for mixing the gas and liquid, and in which the gas is introduced into the liquid before the liquid is introduced into the chamber, after which the liquid with the dissolved gas can be removed via an outlet (4), wherein the liquid is introduced into the chamber (6) tangentially creating an eddy rotating about a mainly horizontal axis in a mainly cylindrical chamber shaped in such a way that essential pressure loss in the chamber is avoided and where the pressure of the liquid is 0.3 to 1 bar, where the liquid with dissolved gas is supplied to a tank from the outlet (4) arranged tangentially to the chamber (6) via pipes (7, 8) and nozzles (10) submerged in the fluid in the tank, where the pressure is released.

2. A method in accordance with claim 1, wherein the eddy movement is such that the mixture has a helical movement.

3. A method in accordance with claim 1, wherein the liquid is introduced via a mainly horizontal inlet (2).

4. A method in accordance with claim 1, wherein the gas is oxygen or carbon dioxide.

5. A method in accordance with claim 1, wherein the liquid is fresh water and/or salt water.

6. Equipment for dissolving a gas or a gas mixture in a liquid, comprising a chamber (6) with an inlet (2) for liquid and gas (3) and an outlet (4) for liquid with dissolved gas, wherein the chamber (6) is cylindrical around a mainly horizontal axis and where the inlet (2) is arranged tangentially in relation to the chamber (6) and where the outlet (4) of the chamber (6) is arranged tangentially in relation to the chamber and is connected to a jet pipe (8) with nozzles (10) adapted to be submerged in liquid, where the liquid with dissolved gas is supplied to a tank via the pipe (8) and the nozzle (10), and where the equipment is placed outside the tank.

7. Equipment in accordance with claim 6, wherein the inlet (2) is located mainly along a horizontal axis.

8. Equipment in accordance with claim 6, wherein the outlet (4) extends vertically upwards.

9. Equipment in accordance with claim 6, wherein the inlet (2) and outlet (4) of the chamber are of such a dimension that they do not cause essential pressure loss.

* * * * *